(12) United States Patent
Huang et al.

(10) Patent No.: US 10,916,175 B2
(45) Date of Patent: Feb. 9, 2021

(54) METHOD FOR CORRECTING UNIFORMITY OF PANEL

(71) Applicant: PEGATRON CORPORATION, Taipei (TW)

(72) Inventors: Wei-Hsing Huang, Taipei (TW); Sheng-Yao Cheng, Taipei (TW); Yu-Chen Tai, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/691,280

(22) Filed: Nov. 21, 2019

(65) Prior Publication Data
US 2020/0312214 A1 Oct. 1, 2020

(30) Foreign Application Priority Data
Mar. 25, 2019 (TW) .............................. 108110321 A

(51) Int. Cl.
*G09G 3/20* (2006.01)
*G06T 7/90* (2017.01)

(52) U.S. Cl.
CPC ............. *G09G 3/2003* (2013.01); *G06T 7/90* (2017.01); *G06T 2207/10024* (2013.01);
(Continued)

(58) Field of Classification Search
CPC ......... G09G 3/2003; G09G 2320/0233; G09G 2320/0242; G09G 2360/145; G09G 5/026;
(Continued)

(56) References Cited

U.S. PATENT DOCUMENTS

| 7,327,404 B2 | 2/2008 | Chen et al. |
| 2003/0053001 A1* | 3/2003 | Murashita ................ G09G 5/02 348/649 |

(Continued)

FOREIGN PATENT DOCUMENTS

| CN | 101527108 | 12/2012 |
| EP | 2523184 | 11/2012 |

(Continued)

OTHER PUBLICATIONS

"Search Report of Europe Counterpart Application", dated Apr. 29, 2020, p. 1-p. 10.

*Primary Examiner* — Premal R Patel
(74) *Attorney, Agent, or Firm* — J.C. Patents

(57) ABSTRACT

A method for correcting uniformity of a panel is provided. A display panel is set with four color patterns respectively, and respective raw data of the four color patterns are respectively measured by an optical instrument. Three primary color chromaticity variations are obtained based on the raw data of each of the four color patterns. A chromaticity uniformity table is obtained based on the chromaticity variations of three primary colors and chromaticity intensity. A proportional calculation is executed for the chromaticity uniformity table to obtain a luminance comparison table. A luminance uniformity table is obtained based on the chromaticity uniformity table, the luminance comparison table, and luminance intensity. The display panel adjusts an output signal based on the chromaticity uniformity table.

10 Claims, 3 Drawing Sheets

(52) U.S. Cl.
 CPC ............ *G09G 2320/0233* (2013.01); *G09G 2320/0242* (2013.01); *G09G 2360/145* (2013.01)

(58) Field of Classification Search
 CPC ... G09G 2320/0238; G09G 2320/0626; G09G 2320/066; G09G 2320/0666; G09G 2320/0673; G09G 2360/147; G09G 2320/0693; G06T 7/90; G06T 2207/10024
 See application file for complete search history.

(56) References Cited

U.S. PATENT DOCUMENTS

| | | | |
|---|---|---|---|
| 2006/0087591 A1 | 4/2006 | Chen et al. | |
| 2007/0052735 A1* | 3/2007 | Chou | G09G 3/2003 345/690 |
| 2008/0225055 A1 | 9/2008 | Yu et al. | |
| 2015/0062144 A1* | 3/2015 | Ben-David | G02F 1/133514 345/589 |
| 2016/0329027 A1* | 11/2016 | Huang | H04N 13/324 |
| 2018/0047325 A1* | 2/2018 | Biwa | G09G 3/32 |
| 2019/0206339 A1* | 7/2019 | Tung | G09G 3/3607 |
| 2020/0098301 A1* | 3/2020 | Bao | G09G 3/3208 |
| 2020/0273913 A1* | 8/2020 | Song | G09G 3/2003 |

FOREIGN PATENT DOCUMENTS

| | | |
|---|---|---|
| JP | 2006147171 | 6/2006 |
| TW | 200614825 | 5/2006 |

\* cited by examiner

METHOD FOR CORRECTING UNIFORMITY OF PANEL

CROSS-REFERENCE TO RELATED APPLICATION

This application claims the priority benefit of Taiwan application serial no. 108110321, filed on Mar. 25, 2019. The entirety of the above-mentioned patent application is hereby incorporated by reference herein and made a part of this specification.

BACKGROUND

Technical Field

The application relates to a display method of a display panel, and particularly relates to a method for correcting uniformity of a panel.

Description of Related Art

Luminance of a display is an important indicator for measuring viewing quality of a viewer. Excessively bright, excessively dark, or uneven chromaticity and luminance will cause viewer's visual discomfort. Therefore, how to improve chromaticity and luminance uniformity of displays has always been a research direction of this field. When the traditional uniformity detection and compensation method is applied to display panels those are different qualities, since optical performances of the display panels are not as expected in theory, unexpected results, such as color blocks, color spots, etc., may be produced.

SUMMARY

The application is directed to a method for correcting uniformity of a panel, which is adapted to reduce color blocks and color spots.

The application provides a method for correcting uniformity of a panel, and the method includes the following steps. A display panel is set with four color patterns respectively, and respective raw data of the four color patterns is respectively measured through an optical instrument. Three primary color chromaticity variations are obtained based on the respective raw data of the four color patterns. A chromaticity uniformity table is obtained based on the three primary color chromaticity variations and chromaticity intensity. A proportional calculation is performed on the chromaticity uniformity table to obtain a luminance comparison table. A luminance uniformity table is obtained based on the chromaticity uniformity table, the luminance comparison table, and luminance intensity. An output signal of the display panel is adjusted based on the luminance uniformity table.

In an embodiment of the application, the optical instrument photographs an output of the display panel to obtain a measurement image, and analyzes the measurement image to obtain a plurality of measurement points. The step of obtaining the chromaticity uniformity table based on the three primary color chromaticity variations and the chromaticity intensity includes the following steps. A three primary color correcting value of each of the measurement points is calculated in a manner of setting chromaticity coordinates of each of the measurement points on the measurement image to approach chromaticity coordinates of a center point of the measurement image. The chromaticity uniformity table is calculated based on the chromaticity coordinates of each of the measurement points, the corresponding three primary color correcting values, the three primary color chromaticity variations, and the chromaticity intensity.

In an embodiment of the application, the three primary color correcting value of each of the measurement points is calculated based on a following equation:

$$\begin{bmatrix} x_i \\ y_i \end{bmatrix} + R_{STEPi}\Delta R_i + G_{STEPi}\Delta G_i + B_{STEPi}\Delta B_i = \begin{bmatrix} x_c \\ y_c \end{bmatrix},$$

where, $$\begin{bmatrix} x_i \\ y_i \end{bmatrix}$$

is chromaticity coordinates of each of the measurement points, $$\begin{bmatrix} x_c \\ y_c \end{bmatrix}$$

is chromaticity coordinates of the center point, $\Delta R_i$, $\Delta G_i$, $\Delta B_i$ represent the three primary color chromaticity variations, $R_{STEPi}$, $G_{STEPi}$, $B_{STEPi}$ represent the three primary color correcting values, and $i \geq 1$.

In an embodiment of the application, the chromaticity uniformity table is calculated according to a following equation:

$$UT_C = \begin{bmatrix} x_i \\ y_i \end{bmatrix} + S_{Ci} \times (R_{STEPi}\Delta R_i + G_{STEPi}\Delta G_i + B_{STEPi}\Delta B_i),$$

where, $UT_C$ is the chromaticity uniformity table, $S_{Ci}$ is the chromaticity intensity, and $i \geq 1$.

In an embodiment of the application, the step of obtaining the luminance uniformity table based on the chromaticity uniformity table, the luminance comparison table, and the luminance intensity includes the following steps. The display panel is set respectively by using the chromaticity uniformity table and the luminance comparison table, and the respective raw data of the chromaticity uniformity table and the luminance comparison table is respectively measured by the optical instrument. A luminance value of a darkest point in the raw data of the chromaticity uniformity table is taken as a reference value. A luminance offset value of each of the measurement points is calculated in a manner of setting a luminance of each of the measurement points to approach the reference value by using a relationship of the chromaticity uniformity table and the luminance comparison table in luminance. The luminance uniformity table is obtained based on the chromaticity uniformity table, the luminance offset value, and the luminance intensity.

In an embodiment of the application, the luminance offset value of each of the measurement points is calculated based on a following equation:

$$\frac{(L_i - L_{Di})}{D} = \frac{(L_i - L_{min})}{(1 - \delta_i)},$$

where, $L_i$ is a luminance value of each of the measurement points in the chromaticity uniformity table, $L_{Di}$ is a luminance value of each of the measurement points in the luminance comparison table, $L_{min}$ is the reference value, D is a parameter used in the proportional calculation, $\delta_i$ is the luminance offset value of each of the measurement points, and $i \geq 1$.

In an embodiment of the application, the luminance uniformity table is calculated based on a following equation:

$$UT_L = UT_C \times S_{Li} \delta \delta_i,$$

where, $UT_L$ is the luminance uniformity table, $UT_C$ is the chromaticity uniformity table, $S_{Li}$ is the luminance intensity, and $i \geq 1$.

In an embodiment of the application, the method for correcting uniformity of panel further includes the following steps. An output of the display panel is photographed by the optical instrument to obtain a measurement image, and the measurement image is analysed to calculate an effective display range of the display panel. An initialization setting is performed.

In an embodiment of the application, the initialization setting includes a color space setting and a backlight parameter setting.

In an embodiment of the application, the four color patterns include a white color pattern, a red color pattern, a green color pattern, and a blue color pattern.

Based on the above description, the uniformity of the chromaticity and the uniformity of the luminance are independently calculated, which avails reducing the color blocks and color spots.

To make the aforementioned more comprehensible, several embodiments accompanied with drawings are described in detail as follows.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

Figure 1:
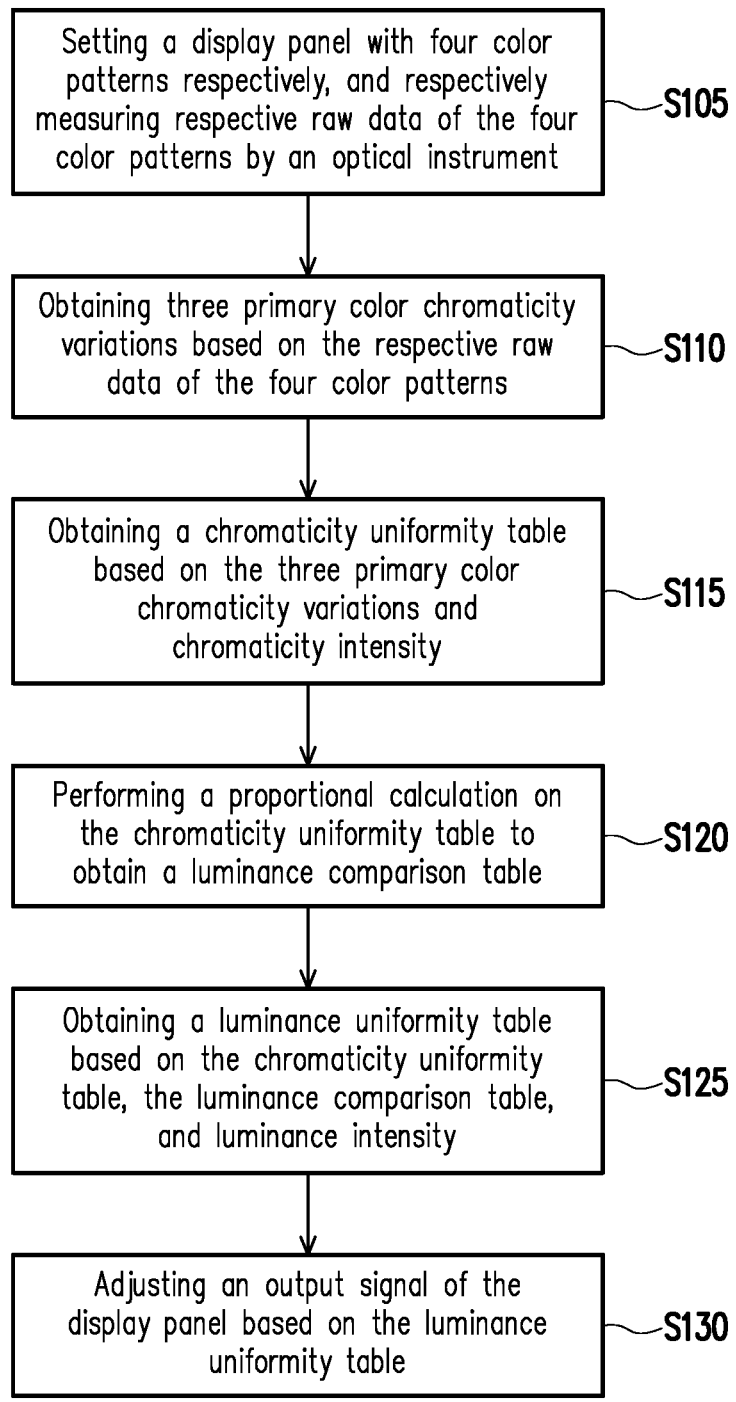
FIG. 1 is a flowchart illustrating a method for correcting uniformity of a panel according to an embodiment of the application.

FIG. 1 is a flowchart illustrating a method for correcting uniformity of a panel according to an embodiment of the application. In the embodiment, an optical instrument is used to measure a display panel, and analyze a chromaticity and luminance of the display panel to complete uniformity parameters of chromaticity and luminance. Moreover, in other embodiment, another electronic apparatus may be adopted for implementation, i.e., raw data of the display panel is measured through the optical instrument, and then the raw data is transmitted to the electronic apparatus for analyzing, so as to obtain the uniformity parameters of chromaticity and luminance.

First, the optical instrument photographs an output of the display panel to obtain a measurement image, and analyzes the measurement image to calculate an effective display range of the display panel, and performs initialization settings. For example, a color space setting and a backlight parameter setting, etc. Thereafter, raw data of four color patterns are respectively generated, measured and processed.

Referring to FIG. 1, in step S105, the display panel is set with four color patterns respectively, and respective raw data of the four color patterns are respectively measured by the optical instrument. The four color patterns include a white color pattern $W_C$, a red color pattern $R_C$, a green color pattern $G_C$ and a blue color pattern $B_C$. A following table 1 shows the four color patterns.

TABLE 1

|  | $R_i$ | $G_i$ | $B_i$ |
|---|---|---|---|
| $W_C$ | C | C | C |
| $R_C$ | $C-R_{gap}$ | C | C |
| $G_C$ | C | $C-G_{gap}$ | C |
| $B_C$ | C | C | $C-B_{gap}$ |

The white color pattern $W_C$, the red color pattern $R_C$, the green color pattern $G_C$ and the blue color pattern $B_C$ are input signals to be set to the display panel. $R_i$, $G_i$ and $B_i$ represent three primary color (red, green and blue, RGB) values of an $i^{th}$ measurement point; where $i \geq 1$.

Figure 2:
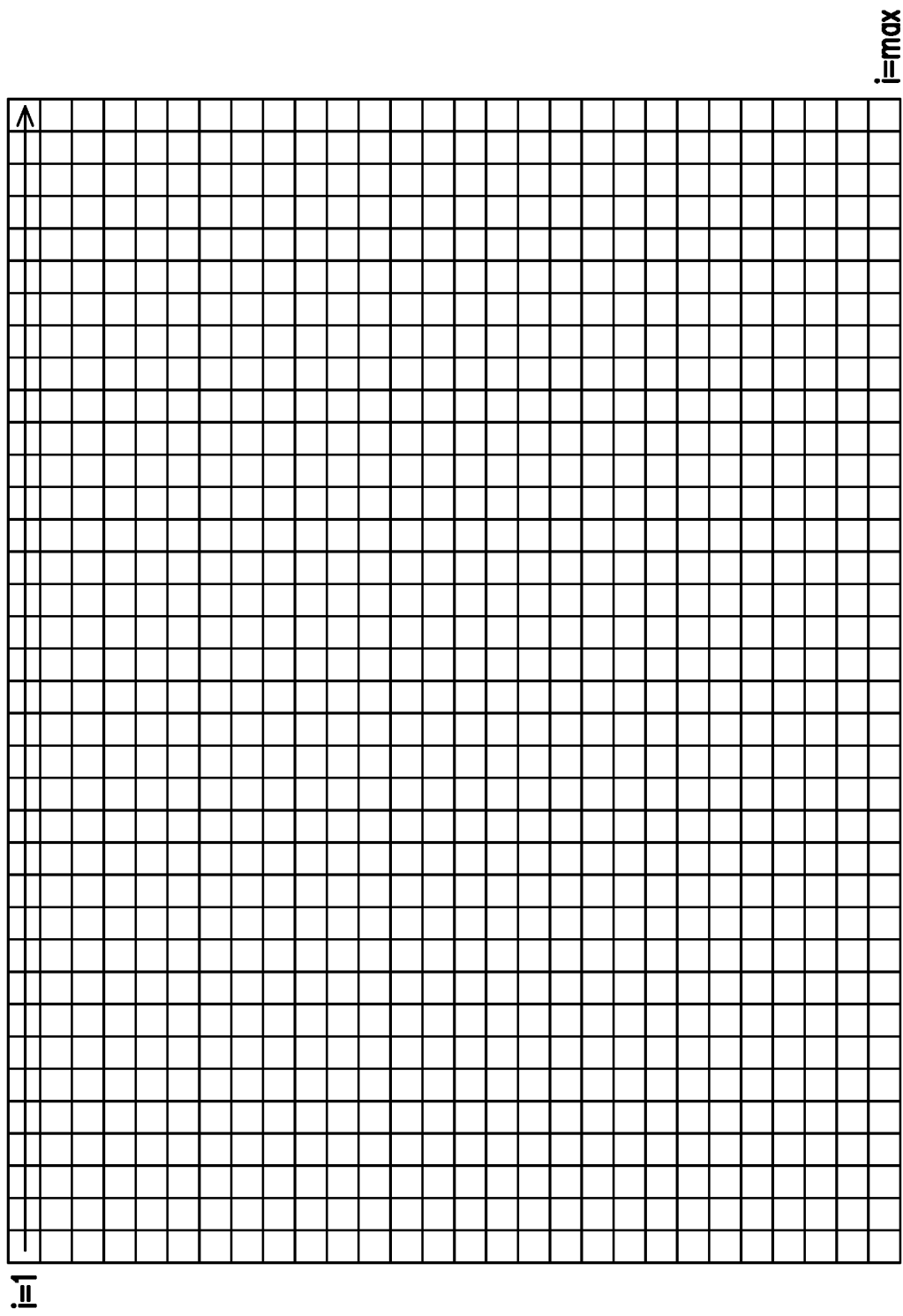
FIG. 2 is a schematic diagram of measurement points obtained from an image photographed by an optical instrument according to an embodiment of the application.

Referring to FIG. 2, FIG. 2 is a schematic diagram of measurement points obtained from an image photographed by the optical instrument according to an embodiment of the application. After the optical instrument photographs the output of the display panel to obtain an image, the optical instrument analyzes the image to initialize the image into i measurement points corresponding to the display panel. Where, one measurement point is composed of a plurality of pixels. As shown in FIG. 2, the measurement points are set on the display panel from left to right and from top to bottom. The measurement point of the upper left corner is $i=1$, and the measurement point of the lower right corner is $i=max$, where max is an integer greater than 1, and is determined by the effective display range of the display panel.

In the table 1, $R_i$, $G_i$, $B_i$ of each of the measurement points in the white color pattern $W_C$ is set to the same parameter C. In the red color pattern $R_C$, $G_i$ and $B_i$ are the same parameter C, and $R_i$ is set to a value less than the parameter C (for example, by a comparison value $R_{gap}$). In the green color pattern $G_C$, $R_i$ and $B_i$ are the same parameter C, and $G_i$ is set to a value less than the parameter C (for example, by a comparison value $G_{gap}$). In the blue color pattern $B_C$, $R_i$ and $G_i$ are the same parameter C, and $B_i$ is set to a value less than the parameter C (for example, by a comparison value $B_{gap}$). The four color patterns are used to learn how much the three primary colors affect the chromaticity of the display panel, respectively.

To be specific, the display panel is set with the white color pattern $W_C$, and after the display panel displays the white color pattern, the optical instrument measures the image displayed on the display panel to obtain the corresponding raw data. Deduced by analogy, the raw data of the red color pattern $R_C$, the green color pattern $G_C$ and the blue color pattern $B_C$ may be obtained.

In step S110, three primary color chromaticity variations are obtained based on the respective raw data of the four color patterns ($W_C$, $R_C$, $G_C$, $B_C$). For example, the raw data of the white color pattern $W_C$ and the red color pattern $R_C$ are compared to obtain $\Delta R$, the raw data of the white color pattern $W_C$ and the green color pattern $G_C$ are compared to obtain $\Delta G$, and the raw data of the white color pattern $W_C$ and the blue color pattern $B_C$ are compared to obtain $\Delta B$. The three primary color chromaticity variations are the $\Delta R$, $\Delta G$, $\Delta B$. $\Delta R = R_C - W_C$, $\Delta G = G_C - W_C$, $\Delta B = B_C - W_C$.

In step S115, a chromaticity uniformity table is obtained based on the three primary color chromaticity variations ($\Delta R$, $\Delta G$, $\Delta B$) and the chromaticity intensity.

A test pattern is first set on the display panel, and the optical instrument is used to photograph the test pattern to obtain a measurement image, so as to obtain tristimulus values ($X_i$, $Y_i$, $Z_i$) of each measurement point on the measurement image, and obtain chromaticity coordinates ($x_i$, $y_i$) of each measurement point according to the tristimulus values. Moreover, a three primary color correcting value of each of the measurement points is calculated in a manner of setting the chromaticity coordinates ($x_i$, $y_i$) of each of the measurement points on the measurement image to approach chromaticity coordinates ($x_c$, $y_c$) of a center point of the measurement image. The chromaticity uniformity table is calculated based on the chromaticity coordinates of each of the measurement points on the measurement image, the corresponding three primary color correcting values, the three primary color chromaticity variations, and the chromaticity intensity.

To be specific, the three primary color correcting value of each of the measurement points corresponding to the display panel is calculated according to a following equation (1), so that the chromaticity coordinates of each of the measurement points approach the chromaticity coordinates of the center point.

$$\begin{bmatrix} x_i \\ y_i \end{bmatrix} + R_{STEPi}\Delta R_i + G_{STEPi}\Delta G_i + \qquad \text{Equation (1)}$$

$$B_{STEPi}\Delta B_i = \begin{bmatrix} x_c \\ y_c \end{bmatrix} \Rightarrow \begin{bmatrix} x_i \\ y_i \end{bmatrix} + R_{STEPi}$$

$$\begin{bmatrix} \Delta R_{xi} \\ \Delta R_{yi} \end{bmatrix} + G_{STEPi}\begin{bmatrix} \Delta G_{xi} \\ \Delta G_{yi} \end{bmatrix} + B_{STEPi}\begin{bmatrix} \Delta B_{xi} \\ \Delta B_{yi} \end{bmatrix} = \begin{bmatrix} x_c \\ y_c \end{bmatrix}$$

Herein, $$\begin{bmatrix} x_i \\ y_i \end{bmatrix}$$

is chromaticity coordinates of an $i^{th}$ measurement point, $$\begin{bmatrix} x_c \\ y_c \end{bmatrix}$$

is the chromaticity coordinates of the center point, $\Delta R_i$, $\Delta G_i$, $\Delta B_i$ represent a three primary color chromaticity variation of the $i^{th}$ measurement point, and $R_{STEPi}$, $G_{STEPi}$, $B_{STEPi}$ represent three primary color correcting values of the $i^{th}$ measurement point.

Through equation (1), the chromaticity coordinates of each measurement point on the measurement image are equal to the chromaticity coordinates of the center point, so that the three primary color correcting values $R_{STEPi}$, $G_{STEPi}$, $B_{STEPi}$ are calculated.

The chromaticity uniformity table is calculated based on a following equation (2).

$$UT_C = \begin{bmatrix} x_i \\ y_i \end{bmatrix} + \qquad \text{Equation (2)}$$

$$S_{Ci} \times (R_{STEPi}\Delta R_i + G_{STEPi}\Delta G_i + B_{STEPi}\Delta B_i),$$

$$i = 1, \ldots, \max$$

Herein, $UT_C$ is the chromaticity uniformity table, and $Sc_i$ is chromaticity intensity (0%-100%) of the $i^{th}$ measurement point.

The chromaticity uniformity table $UT_C$ may be regarded as a general table, which records the chromaticity coordinates ($x_i$, $y_i$) of each of the measurement points. That is, the chromaticity uniformity table includes $\{(x_1, y_1), (x_2, y_2), (x_3, y_3), \ldots, (x_{max-1}, y_{max-1}), (x_{max}, y_{max})\}$.

Figure 3:
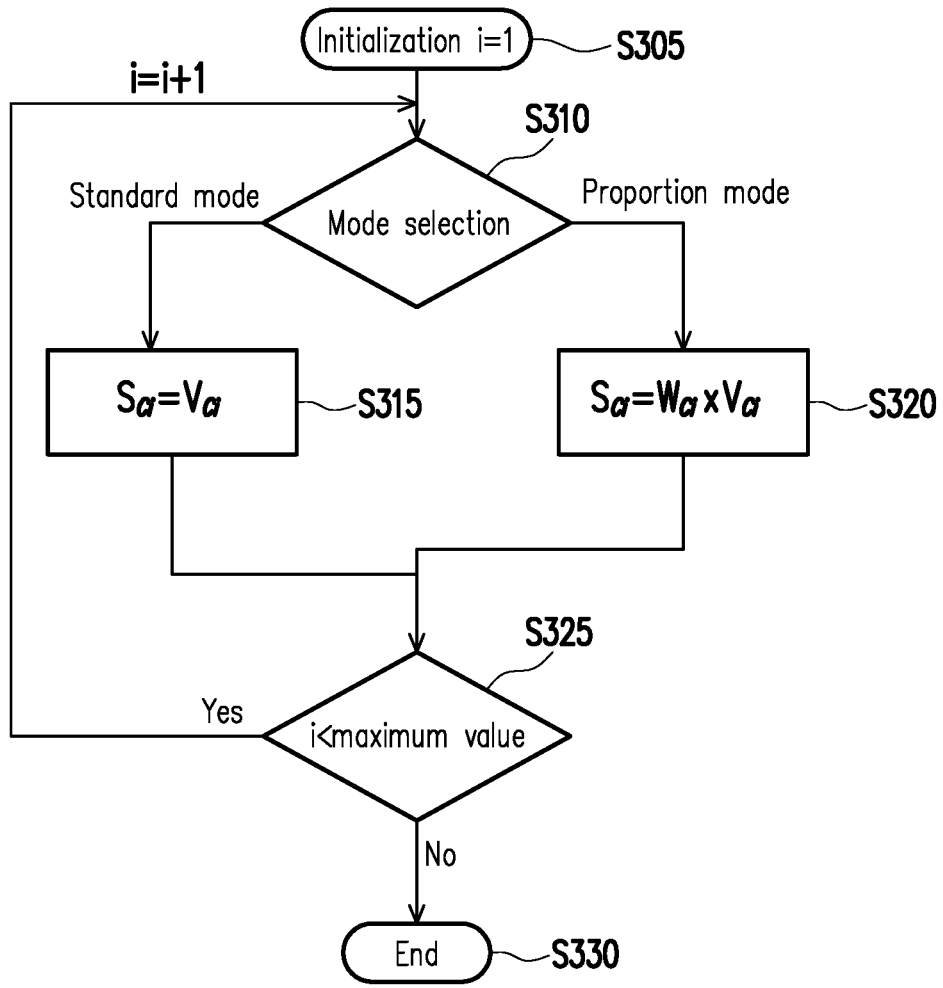
FIG. 3 is a flowchart illustrating a method of setting chromaticity intensity according to an embodiment of the application.

FIG. 3 is a flowchart illustrating a method of setting the chromaticity intensity according to an embodiment of the application. In the embodiment, two modes are provided for users to choose, i.e., a standard mode and a proportion mode. Referring to FIG. 3, in step S305, i is initialized to 1, i.e., setting of the chromaticity intensity is started from a first measurement point. Then, in step S310, the mode is selected. If the standard mode is selected, step S315 is executed, and if the proportion mode is selected, step S320 is executed. In the standard mode of step S315, the chromaticity intensity $Sc_i$ is set to a fixed parameter $V_{Ci}$. In the proportion mode of step S320, different weights $W_{Ci}$ may be set according to different distances from the center point, and then, the weight $W_{Ci}$ is multiplied with the fixed parameter $V_{Ci}$ to obtain the chromaticity intensity $S_{Ci}$.

Then, in step S325, it is determined whether i is smaller than the maximum value (the maximum value=max). If i is still smaller than the maximum value, i is added by 1, and the flow returns to step S310. If i is equal to the maximum value, it represents that setting of the color intensities of all of the measurement points is completed, and step S330 is executed to end the flow.

Moreover, setting of the luminance intensity is also the same as setting of the chromaticity intensity shown in FIG. 3, i.e., the chromaticity intensity $S_{Ci}$ is changed to the luminance intensity $S_{Li}$, the fixed parameter $V_{Ci}$ is changed to $V_{Li}$, and the weight $W_{Ci}$ is changed to $W_{Li}$.

After the chromaticity uniformity table $UT_C$ is obtained based on the equation (2), the flowchart of FIG. 1 is performed again. In step S120, a proportional calculation (for example, scaling down) is performed on the chromaticity uniformity table $UT_C$ to obtain a luminance comparison table $W_L$. Since common attenuation of R, G, B may cause a change of the luminance, the proportional calculation is performed on the chromaticity uniformity table $UT_C$. For example, chromaticity of the $i^{th}$ measurement point is originally $\alpha_i$, $\beta_i$, $\gamma_i$, and $\alpha_i$, $\beta_i$, $\gamma_i$ are all multiplied with a parameter D, where the parameter D is a value smaller than 1 and greater than 0. As shown in a following table 2, $R_i$, $G_i$, $B_i$ of the $i^{th}$ measurement point in the chromaticity uniformity table $UT_C$ are respectively $\alpha_i$, $\beta_i$, $\gamma_i$, and $\alpha_i$, $\beta_i$, $\gamma_i$ are respectively multiplied by the parameter D to obtain the luminance comparison table $W_L$.

TABLE 2

|  | $R_i$ | $G_i$ | $B_i$ |
|---|---|---|---|
| $UT_C$ | $\alpha_i$ | $\beta_i$ | $\gamma_i$ |
| $W_L$ | $\alpha_i \times D$ | $\beta_i \times D$ | $\gamma_i \times D$ |

Then, in step S125, a luminance uniformity table $UT_L$ is obtained based on the chromaticity uniformity table $UT_C$, the luminance comparison table $W_L$ and the luminance intensity $S_{Li}$.

The chromaticity uniformity table and the luminance comparison table are respectively used to set the display panel, and the optical instrument is used to respectively measure the respective raw data of the chromaticity uniformity table and the luminance comparison table. A luminance value of the darkest point is found in the raw data of the chromaticity uniformity table to serve as a reference value, and a luminance offset value of each of the measurement points is calculated in a manner of setting a luminance of each of the measurement points to approach the reference value by using a relationship of the chromaticity uniformity table and the luminance comparison table in luminance. Thereafter, the luminance uniformity table is obtained based on the chromaticity uniformity table, the luminance offset value, and the luminance intensity. The luminance uniformity table $UT_L$ may be regarded as a general table, which records the luminance value of each of the measurement points including $\{L_{V1}, L_{V2}, L_{V3}, \ldots, Lv_{max-1}, Lv_{max}\}$.

The luminance offset value of each of the measurement points is calculated based on a following equation:

$$\frac{(L_i - L_{Di})}{D} = \frac{(L_i - L_{min})}{(1 - \delta_i)},$$

where, $L_i$ is a luminance value of each of the measurement points in the chromaticity uniformity table $UT_C$, $L_{Di}$ is a luminance value of each of the measurement points in the luminance comparison table $W_L$, $L_{min}$ is a reference value (i.e., the luminance value of the darkest point in the chromaticity uniformity table $UT_C$), D is a parameter used in the proportional calculation, and $\delta_i$ is a luminance offset value of each measurement point.

The luminance uniformity table $UT_L$ is obtained based on the chromaticity uniformity table, the luminance offset value, and the luminance intensity, as shown by a following equation:

$$UT_L = UT_{Ci} \times S_{Li} \times \delta_i, \, i=1, \ldots, \text{max},$$

where, $UT_L$ is the luminance uniformity table, $UT_C$ is the chromaticity uniformity table, and $S_{Li}$ is the luminance intensity (0%-100%).

Referring back to FIG. 1, in step S130, the luminance uniformity table is set into the display panel. That is, the output signal of the display panel is adjusted based on the luminance uniformity table.

In view of the above, the uniformity of the chromaticity and the uniformity of luminance are independently calculated, which avails reducing the color blocks and color spots. Moreover, by respectively adding the parameter (0%-100%) of intensity to the uniformities of the chromaticity and luminance, the optical characteristics in chromaticity and luminance may be finely adjusted, so as to produce the adjustment of the expected chromaticity and luminance.

It will be apparent to those skilled in the art that various modifications and variations can be made to the disclosed embodiments without departing from the scope or spirit of the application. In view of the foregoing, it is intended that the application covers modifications and variations provided they fall within the scope of the following claims and their equivalents.

What is claimed is:

1. A method for correcting uniformity of a panel, comprising:
   setting a display panel with four color patterns respectively, and respectively measuring respective raw data of the four color patterns by an optical instrument;
   obtaining three primary color chromaticity variations based on the respective raw data of the four color patterns;
   obtaining a chromaticity uniformity table based on the three primary color chromaticity variations and chromaticity intensity;
   performing a proportional calculation on the chromaticity uniformity table to obtain a luminance comparison table;
   obtaining a luminance uniformity table based on the chromaticity uniformity table, the luminance comparison table, and luminance intensity; and
   adjusting an output signal of the display panel based on the luminance uniformity table.

2. The method for correcting uniformity of a panel as claimed in claim 1, wherein the optical instrument photographs an output of the display panel to obtain a measurement image and analyzes the measurement image to obtain a plurality of measurement points,
   wherein the step of obtaining the chromaticity uniformity table based on the three primary color chromaticity variations and the chromaticity intensity comprises:
   calculating a three primary color correcting value of each of the measurement points in a manner of setting chromaticity coordinates of each of the measurement points on the measurement image to approach chromaticity coordinates of a center point of the measurement image; and
   calculating the chromaticity uniformity table based on the chromaticity coordinates of each of the measurement points, the corresponding three primary color correcting values, the three primary color chromaticity variations, and the chromaticity intensity.

3. The method for correcting uniformity of a panel as claimed in claim 2, wherein the three primary color correcting value of each of the measurement points is calculated based on a following equation:

$$\begin{bmatrix} x_i \\ y_i \end{bmatrix} + R_{STEPi}\Delta R_i + G_{STEPi}\Delta G_i + B_{STEPi}\Delta B_i = \begin{bmatrix} x_c \\ y_c \end{bmatrix};$$

wherein $$\begin{bmatrix} x_i \\ y_i \end{bmatrix}$$

are the chromaticity coordinates of each of the measurement points, $$\begin{bmatrix} x_c \\ y_c \end{bmatrix}$$

are the chromaticity coordinates of the center point, $\Delta R_i$, $\Delta G_i$, $\Delta B_i$ represent the three primary color chromaticity variations, $R_{STEPi}$, $G_{STEPi}$, $B_{STEPi}$ represent the three primary color correcting values, and $i \geq 1$.

4. The method for correcting uniformity of a panel as claimed in claim 3, wherein the chromaticity uniformity table is calculated according to a following equation:

$$UT_C = \begin{bmatrix} x_i \\ y_i \end{bmatrix} + S_{Ci} \times (R_{STEPi}\Delta R_i + G_{STEPi}\Delta G_i + B_{STEPi}\Delta B_i);$$

wherein $UT_C$ is the chromaticity uniformity table, $S_{Ci}$ is the chromaticity intensity, and $i \geq 1$.

5. The method for correcting uniformity of a panel as claimed in claim 2, wherein the step of obtaining the luminance uniformity table based on the chromaticity uniformity table, the luminance comparison table, and the luminance intensity comprises:

respectively setting the display panel by using the chromaticity uniformity table and the luminance comparison table and respectively measuring the respective raw data of the chromaticity uniformity table and the luminance comparison table through the optical instrument;

taking a luminance value of a darkest point in the raw data of the chromaticity uniformity table as a reference value;

calculating a luminance offset value of each of the measurement points in a manner of setting a luminance of each of the measurement points to approach the reference value by using a relationship of the chromaticity uniformity table and the luminance comparison table in luminance; and obtaining the luminance uniformity table based on the chromaticity uniformity table, the luminance offset value, and the luminance intensity.

6. The method for correcting uniformity of a panel as claimed in claim 5, wherein the luminance offset value of each of the measurement points is calculated based on a following equation:

$$\frac{(L_i - L_{Di})}{D} = \frac{(L_i - L_{min})}{(1 - \delta_i)};$$

wherein $L_i$ is a luminance value of each of the measurement points in the chromaticity uniformity table, $L_{Di}$ is a luminance value of each of the measurement points in the luminance comparison table, $L_{min}$ is the reference value, D is a parameter used in the proportional calculation, $\delta_i$ is the luminance offset value of each of the measurement points, and $i \geq 1$.

7. The method for correcting uniformity of a panel as claimed in claim 6, wherein the luminance uniformity table is calculated based on a following equation:

$$UT_L = UT_{Ci} \times S_{Li} \times \delta_i;$$

wherein $UT_L$ is the luminance uniformity table, $UT_C$ is the chromaticity uniformity table, $S_{Li}$ is the luminance intensity, and $i \geq 1$.

8. The method for correcting uniformity of a panel as claimed in claim 1, further comprising:

photographing an output of the display panel through the optical instrument to obtain a measurement image, and analyzing the measurement image to calculate an effective display range of the display panel; and performing an initialization setting.

9. The method for correcting uniformity of a panel as claimed in claim 8, wherein the initialization setting comprises: a color space setting and a backlight parameter setting.

10. The method for correcting uniformity of a panel as claimed in claim 1, wherein the four color patterns comprise a white color pattern, a red color pattern, a green color pattern, and a blue color pattern.

* * * * *